United States Patent
Bell

(10) Patent No.: US 6,330,630 B1
(45) Date of Patent: Dec. 11, 2001

(54) COMPUTER SYSTEM HAVING IMPROVED DATA TRANSFER ACROSS A BUS BRIDGE

(75) Inventor: D. Michael Bell, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/266,744

(22) Filed: Mar. 12, 1999

(51) Int. Cl.[7] .................................................. G06F 13/00
(52) U.S. Cl. ........................... 710/129; 710/129; 710/55; 711/135
(58) Field of Search ................................... 710/129, 128, 710/126, 52, 55; 370/402; 711/113, 135

(56) References Cited

U.S. PATENT DOCUMENTS

| | | | |
|---|---|---|---|
| 5,377,341 | * | 12/1994 | Kaneko et al. . |
| 5,535,345 | * | 7/1996 | Fisch et al. . |
| 5,572,660 | * | 11/1996 | Jones . |
| 5,694,556 | * | 12/1997 | Neal et al. . |
| 5,758,166 | * | 5/1998 | Ajanovic . |
| 5,828,865 | | 10/1998 | Bell . |
| 5,835,741 | * | 11/1998 | Elkhoury et al. . |
| 5,915,104 | * | 6/1999 | Miller . |
| 5,974,502 | * | 10/1999 | DeKoning et al. ................... 711/114 |
| 5,987,555 | * | 11/1999 | Alzien et al. ........................ 710/129 |
| 6,134,622 | * | 10/2000 | Kapur et al. ......................... 710/128 |
| 6,138,192 | * | 10/2000 | Hausauer ............................. 710/100 |
| 6,148,356 | * | 11/2000 | Archer et al. ........................ 710/127 |

* cited by examiner

Primary Examiner—Paul R. Myers
(74) Attorney, Agent, or Firm—Antonelli, Terry, Stout & Kraus, LLP

(57) ABSTRACT

A bus bridge receives an inbound read request from a master. In response to the read request, the bridge transmits multiple (e.g., two) read request packets to fetch data. The fetched data is stored in the bridge when it returns. When the master returns for its data, the data from each packet is transferred to the master if the data is valid. By issuing two smaller read request packets in response to an inbound read request, inbound read latency is reduced. In addition, if only a single master is being serviced, the system speculatively prefetches data for the master when the master returns to receive its data. Also, if the master is disconnected before completing the data transfer, the data can be subsequently restreamed from the bridge if the data is still valid when the master reconnects.

26 Claims, 9 Drawing Sheets

COMPUTER SYSTEM HAVING IMPROVED DATA TRANSFER ACROSS A BUS BRIDGE

CROSS-REFERENCE TO RELATED APPLICATIONS

The subject matter of the present application is related to the subject matter of U.S. application Ser. No. 09/012,775, filed on Jan. 23, 1998 and entitled "Method and Apparatus For Restreaming Data That Has Been Queued In A Bus Bridging Device," hereby incorporated by reference.

BACKGROUND OF THE INVENTION

The invention generally relates to computer bus systems and in particular to a system for transferring data between devices on different sides of a bus bridge.

To support the high-bandwidth data transfers demanded by modern computer applications, data is transmitted across buses at very high rates. To achieve reliable, high speed data transfer, a computer system often includes a number of buses arranged in a hierarchy and interconnected by devices known as bus bridges.

In essence, a bus bridge is a load isolating device that allows multiple devices to appear as a single capacitive load to the bus which they are bridged. Although the reduced capacitive loading increases the maximum frequency at which a bus can operate, the bridge adds a layer of complexity in the design and operation of the computer system. Further complexity can result if the bridge is used to interconnect different types of buses because the bridge will translate data, commands and other control signals between the two bus formats.

One reason that bus bridges add complexity is that requests to transfer data from a requester side of a bridge to a target side of the bridge must often be buffered in the bridge in order to support split transactions. Split transactions allow a device to submit a request (e.g., read or write) to a bus bridge over a first bus. Rather than maintaining the connection with the bus bridge while the bridge performs the requested transaction, the device disconnects from the bridge to allow other devices to have access to the bus bridge. After the bridge completes the requested transaction, the requesting device reconnects to the bridge and receives the transaction confirmation (e.g., the requested data).

One example of a split transaction is a Delayed Transaction as defined in the Peripheral Component Interconnect (PCI) Local Bus Specification, Rev. 2.1, Jun. 1, 1995, available from the PCI Special Interest Group, Portland, Oreg. After submitting a transaction request (e.g., a read request) to a bus bridge, the PCI device is required to disconnect from the bridge. The PCI device continually retries the transaction until the bus bridge provides the requested data.

It will be appreciated that any transaction that crosses the bus bridge will incur a latency penalty. Moreover, because the latency penalty is incurred with each transfer across the bridge, latency can be reduced by fetching larger blocks of data. However, inbound read latency as seen by the requesting PCI device increases with the size of the block of data fetched from memory because the bridge may need to arbitrate for and access the memory system several times before receiving all the requested data on behalf of the PCI device.

In addition, after providing the fetched data to the requesting device, the device is typically disconnected from the bridge to allow other devices to access the bridge. For applications where there are multiple PCI masters sharing and arbitrating for ownership of a single PCI bus, this technique works well because each PCI master is disconnected from the bridge after receiving the fetched data.

Many newer I/O devices (e.g., a Gigabit Ethernet card) typically transfer much larger blocks of data and require higher bandwidth. For such high bandwidth devices, it is not unusual for a single PCI device to control or own a PCI bus for extended periods of time. In fact, only one PCI device may be connected to the PCI bus. In such cases, however, fetching a single block and then disconnecting the PCI master after each read results in a very inefficient use of the PCI bus bandwidth.

Therefore, a need exists for a computer system that improves usage of I/O bus bandwidth, reduces inbound read latency, and permits either multiple masters or a single master to be serviced efficiently.

SUMMARY OF THE INVENTION

According to an embodiment of the present invention, a method of processing a read request is provided. The method includes the steps of receiving an inbound read request from a first master, fetching first and second groups of data in response to the inbound read request, storing the first group of data and marking the first group of data as available and storing the second group of data and marking the second group of data as available. The method further includes the step of receiving a retry of the read request from the first master. If the first group of data is available, the first group of data is transferred to the first master in response to the retry of the read request from the first master. After transferring the first group of data to the first master, if the second group of data is available, the second group of data is transferred to the first master.

DETAILED DESCRIPTION

Figure 1:
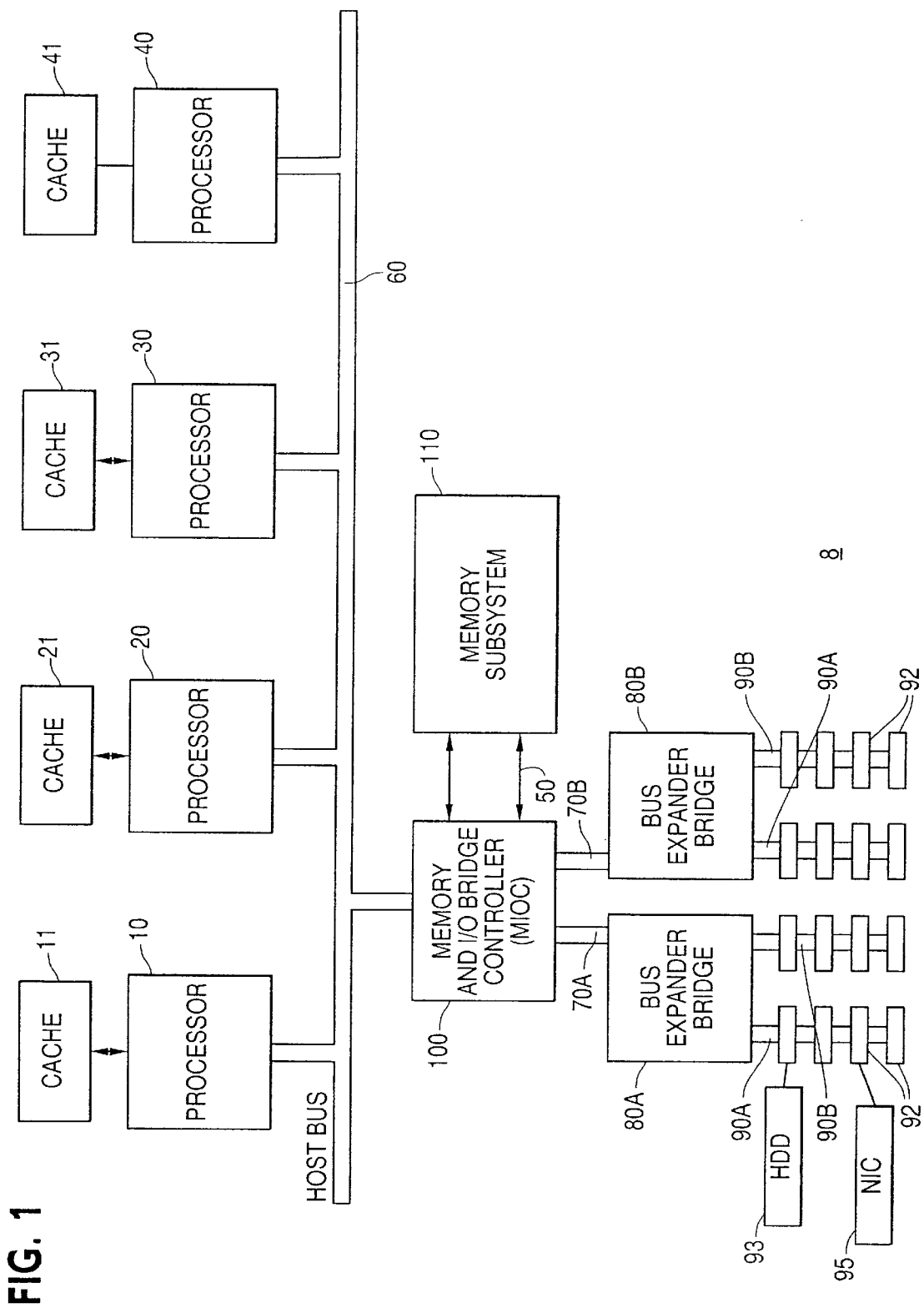
FIG. 1 is a block diagram illustrating a computer system according to an embodiment of the present invention.

According to embodiments of the present invention, a bus bridge receives an inbound read transaction from a PCI master. Instead of forwarding the PCI read transaction as a single large read transaction to memory, the bus bridge enqueues the PCI read transaction as multiple (e.g., two)

smaller read transactions and issues two corresponding read request packets. The data received in response to the first read request packet is stored in a first data queue when it returns and is marked as valid (or available), and the data from the second read request packet is stored in a second data queue in the bus bridge. When the PCI master returns for its data (e.g., resubmits its read request), if the data in the first data queue is valid, this data is transferred (or streamed) to the master. During the transfer of data from the first data queue, the bridge examines the status of the second data queue. If the data in the second data queue is valid (available), the bus bridge continues streaming data from the second queue to the master. If the master returns for its data before the data from the second read request has been received, the bus bridge can begin streaming data from the first data queue to the master while concurrently receiving and storing data in the second data queue. As a result, by issuing multiple read request packets requesting smaller amounts of data, inbound read latency as seen by the master is decreased.

In addition, the system of the present invention speculatively prefetches data from memory for a master when the bus bridge is servicing a single master to increase data throughput to the master. Because of the limited queue resources, prefetching occurs only when the bus bridge is servicing a single PCI master. After the data returns and is stored in the first data queue, if the first PCI master returns for its data (i.e., retries the PCI read transaction) before another master submits a read request (and the bus bridge is not tracking or processing read requests for any other masters), the bus bridge speculatively issues a third and fourth read request packets and allocates a third and fourth data queues to store the data for these packets. If the data received in response to the third read request packet returns and is marked as valid before the data from the second queue has been fully transferred to the master, the bus bridge continues streaming (transferring) data from the third data queue. Data is also streamed from the fourth data queue if available. When the first master begins receiving data from the third data queue, the bus bridge issues two more read request packets (so long as no inbound read requests have been received from other masters). This allows the bus bridge to improve data throughput to the single master by allocating queue resources to the single master and by continuously prefetching additional data for the master while the bridge is servicing only that master. This reduces the number of disconnects in a single master situation.

While the system of the present invention allows efficient servicing of a single master, the present invention is adaptive and allows multiple masters to be detected and efficiently serviced as well. If the bus bridge receives an inbound read request from a different PCI master or a different PCI master arbitrates for ownership of the PCI bus, speculative prefetch is inhibited in favor of servicing multiple masters. In such a case, available bus bridge queues are allocated to track and process the inbound read requests from the new master(s). Subsequently, if the bus bridge completes the transactions for one or more masters and returns to servicing only a single master, the bus bridge resumes speculatively prefetching for the single master to improve data throughput and make better use of the PCI bandwidth for the single master.

After receiving and storing data in the first and second data queues in response to an inbound read transaction from a master, the data is streamed (transferred) to the master when it returns for its data. In some cases, the master will disconnect from the bus bridge before completing the transfer of the data stored in the first and second data queues. In such a case, the data is marked as partially consumed and the bus bridge begins monitoring data transfers across the bus bridge. If an invalidating event is detected (indicating that some of the data stored in either the first or second data queues may be stale) or if these data queues are required to track a new inbound read transaction, the first and second queues are marked as invalid and are reallocated for tracking a new transaction. In such a case, if the PCI master returns to continue receiving data where it left off, the bus bridge must refetch the requested data from memory (i.e., must retransmit two new read request packets) since the data in the data queues is not available (e.g., the data is either stale or the queues have been reallocated). Otherwise, if the data in the data queues is not stale and the data queues are not required to track other read transactions, the data from the first and second data queues can be restreamed (directly transferred from the data queues without refetching the data) to the PCI master when it returns to receive the data where it left off.

Referring to the figures in which like numerals indicate like elements, FIG. 1 is a block diagram which illustrates a computer system according to an embodiment of the present invention. Computer system 8 includes a plurality of processors, including processors 10, 20, 30 and 40. Each of processors 10, 20, 30 and 40 is connected to a cache 11, 21, 31 and 41, respectively. The processors are connected to a host bus 60 of computer system 8. A memory subsystem 110 is connected to host 60 via lines 50, and includes memory, such as dynamic random access memory and associated control logic. Computer system 8 also includes a memory and input/output (I/O) bridge controller (MIOC) 100 connected to host bus 60 for interfacing one or more I/O buses (other external buses) and memory subsystem 110 to host bus 60. Although MIOC 100 is shown as a single block or component in FIG. 1, the MIOC 100 can alternatively be provided as a separate memory controller and a separate I/O bridge controller (or I/O controller).

Computer system 8 also includes a plurality of bus expander bridges 80 (bus bridges) connected to MIOC 100 for interfacing one or more external buses to host bus 60. According to the embodiment illustrated in FIG. 1, two bus expander bridges 80A and 80B are connected to MIOC 100 via expander buses 70A and 70B, respectively. Although only two bus expander bridges 80A and 80B are connected to MIOC 100, there may be any number of bus expander bridges 80 (e.g., 80A, 80B, 80C, 80D) connected to MIOC 100.

Each bus expander bridge 80 includes multiple PCI ports wherein each PCI port is provided for connecting and interfacing to a PCI bus. In the embodiment illustrated in FIG. 1, bus expanded bridges 80A and 80B each includes two PCI ports for accomodating two PCI buses 90A and 90B. Expander buses 70A and 70B and PCI buses 90A and 90B are bi-directional buses. A plurality of PCI expansion slots 92 are connected to each PCI bus 90 to allow one or more PCI devices to be plugged in on connected to each PCI bus 90. A wide variety of PCI devices or adapters may be plugged in to PCI expansion slots 92, such as a PCI compatible hard-disk drive, a graphics card, a tape drive, a network interface card, etc. As examples of PCI devices (or PCI masters), a hard disk drive (HDD) 93 and a network interface card (NIC) 95 are connected to PCI bus 90A. The bus expander bridges 80 operate as bus bridges to allow for multiple external buses (e.g., PCI buses) to be connected to host bus 60 without degrading host bus performance because the multiple external buses appear as a single electrical load on host bus 60.

Although expander bridges 80A and 80B according to an embodiment each provide an interface to PCI buses, the expander bridges 80A and 80B of the present invention could alternatively interface to other types of external buses. Therefore, the bus expander bridge 80 of the present invention is therefore not limited to interfacing to PCI buses.

According to an embodiment of the present invention, each bus expander bridge 80 provides two independent 32-bit, 33 MHZ, Rev. 2.1 compliant PCI interfaces. Each PCI interface requires 50 signals for the bus, plus 12 additional and support signals according to the PCI standard. Each bus expander bridge 80 provides the primary control and data interface between the PCI buses 90A and 90B and the expander buses 70A and 70B. Each bus expander bridge 80 includes PCI ports for accomodating multiple PCI buses as illustrated in FIG. 1. In addition, each bus expander bridge 80 can also be configured to combine multiple PCI buses to provide a single PCI bus having increased bandwith.

In operation, various transactions flow across computer system 8 including transactions between processor 10 (or other processors) and PCI devices connected to PCI buses 90A and 90B, transactions between processor 10 and memory subsystem 110, and transactions between different PCI devices.

According to an embodiment of the present invention, the bus transactions across host bus 60 and expander buses 70A and 70B are full split transactions and consist of a request packet and a completion packet. There are two types of transactions: a read transaction, and a write transaction. The request packet initiates a transaction. Completion packets are used to return data (only for a read request), to indicate that a transaction has been completed on the destination device, and to reallocate buffer or queue resources.

A packet of information consists of multiple 32-bit words (also known as double words or Dwords, where a Dword is 4 bytes, according to an embodiment). Each packet includes a header that consists of address and control information and can include a data portion. The header of the packet is provided as one or more Dwords that includes the command (read or write), address information, a transaction ID identifying the transaction, routing information, and additional control information. The data portion of a packet can include one or more Dwords of data. A completion packet contains the transaction ID corresponding to the original request, an indication that the transaction was completed, and other control information. A read completion packet also includes the requested data retrieved (if any) in response to the read request. A write completion contains no data but indicates that the write was completed successfully.

Transactions in computer system 8 can be categorized as either inbound transactions or outbound transactions. Inbound transactions are those transactions initiated by a PCI master (or PCI device) connected to buses 90A or 90B. For example, a PCI device operating as a PCI master may initiate an inbound read operation to memory sub-system 110. An outbound transaction is a transaction initiated by, for example, processor 10 and directed to a device connected to PCI buses 90A or 90B. For example, an outbound transaction could include a processor read of a hard disk drive 93 connected to one of the PCI expansion slots 92 (FIG. 1).

Figure 2:
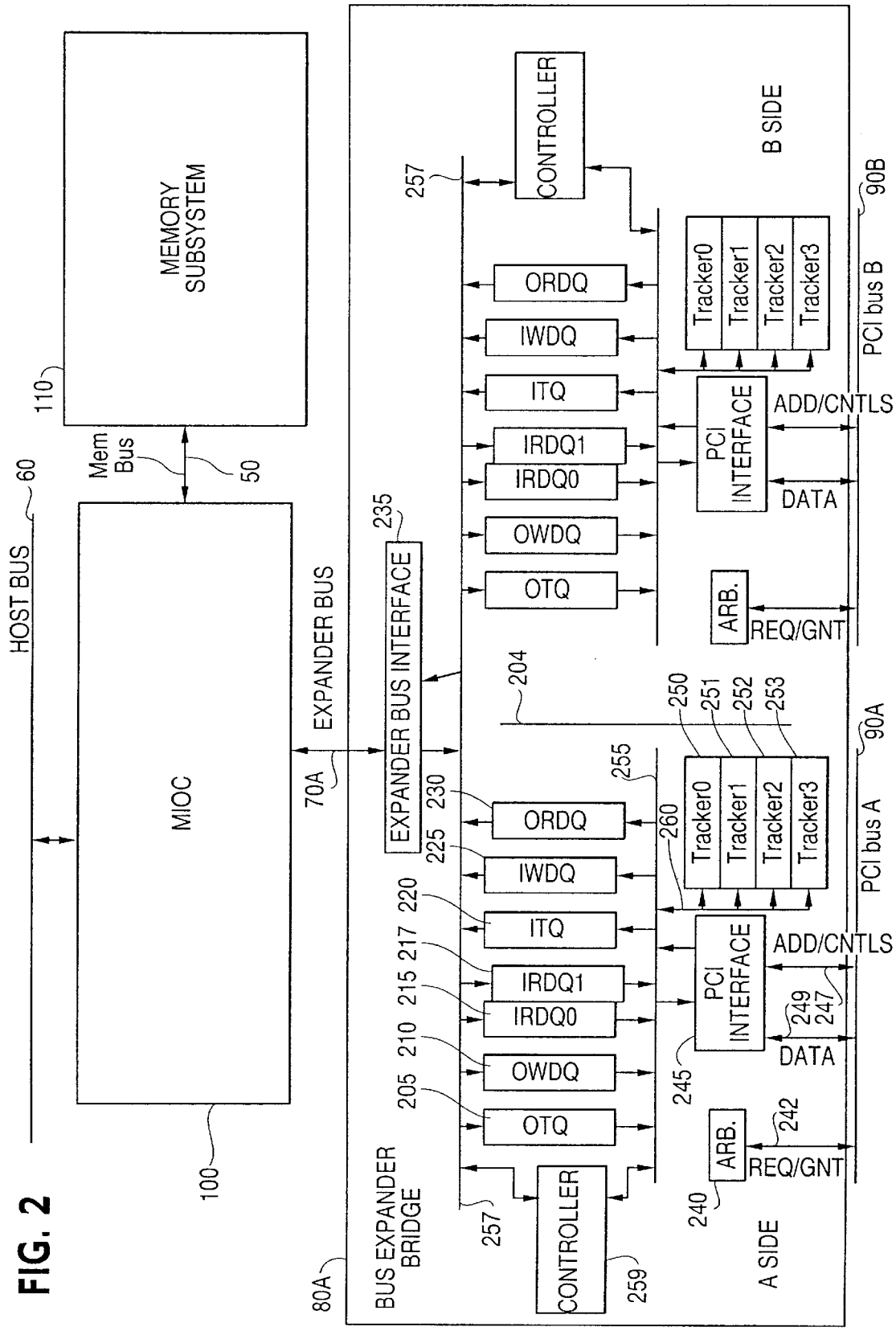
FIG. 2 is a block diagram illustrating a computer system including further details of a bus expander bridge according to an embodiment of the present invention.

FIG. 2 is a block diagram which illustrates a computer system including further details of a bus expander bridge according to an embodiment of the present invention. As shown in FIG. 2, MIOC 100 is connected to host bus 100 via line 202 and to a memory subsystem 110 via memory bus 50. A bus expander bridge 80A is connected to MIOC 100 via expander bus 70A. Bus expander bridge 80A is connected to expander bus 70A and PCI bus 90A (PCI bus A) and PCI bus 90B (PCI bus B).

Bridge 80A is divided into two substantially identical halves or sides (A-side and B-side) wherein each side services one of the 32-bit PCI buses 90A or 90B. Thus, bridge 80A is generally symmetrical about line 204. Components on only the A side of bridge 80A will be discussed in detail because the components and operation of the B side of bridge 80A are the same as the A side. There is one common expander bus interface 235 that services both sides of bus expander bridge 80A.

The specific elements or components for each side of bus expander bridge 80A will now be briefly described. As noted, each side of bus expander bridge 80A is substantially the same. Each side of the bus expander bridge 80A includes several queues to store address and control information and data, including:

an outbound transaction queue (OTQ) 205 for storing addresses and control information for outbound read and write requests and inbound read completion packets;

an outbound write data queue (OWDQ) 210 for storing outbound write data;

first inbound read data queue (IRDQ0) 215 and a second inbound read queue (IRDQ1) 217, each for storing inbound read data for different read completions.

an inbound transaction queue (ITQ) 220 for storing addresses and control information for inbound read and write requests and outbound completion packets;

an inbound write data queue (IWDQ) 225 for storing inbound write data; and an outbound read data queue (ORDQ) 215 for storing outbound read data.

Each side of bridge 80A also includes a PCI bus arbiter 240 for receiving requests for PCI bus ownership and granting such requests (req/gnt) via line 242 to PCI devices connected to PCI bus 90A. A PCI interface 245 is provided for receiving PCI transactions, including address and control signals via line 247 and data via line 249, and for generating and outputting PCI transactions onto PCI bus 90A. Four tracker registers, including tracker registers 250–253 (tracker0–tracker3) are connected to bus 255 via line 260. Tracker registers 250–253 are provided for tracking inbound PCI read requests and their completions (or replies). Queues 205, 210, 215, 217, 220, 225 and 230 on both sides of bridge 80A are connected to expander bus interface 235 via a common bus 257. In addition, a controller 259 is connected via line 261 to bus 257 and via line 263 to bus 255. Controller 259 controls the overall operation of the A side of the bridge 80A.

Figure 3:
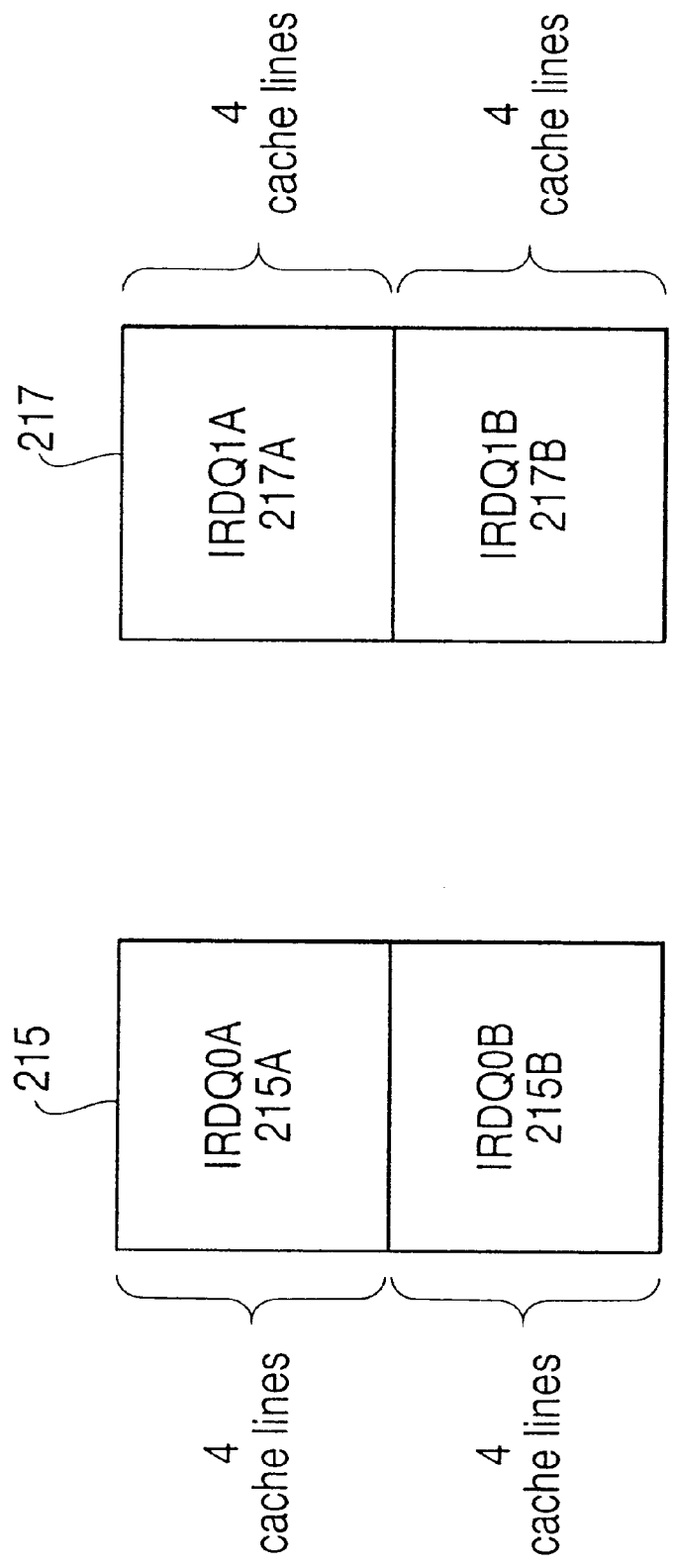
FIG. 3 illustrates the format of inbound read data queues (IRDQs) according to an embodiment of the present invention.

FIG. 3 illustrates the format of the inbound read data queues (IRDQs) 215 and 217 according to an embodiment of the present invention. IRDQ0 215 includes two buffers or queues, including IRDQ0A 215A and IRDQ0B 215B. Likewise IRDQ1 217 includes IRDQ1A 217A and IRDQ1B 217B. According to an embodiment, each queue 215A, 215B, 217A and 217B can store up to four cache lines (or 128 bytes or 32 Dwords), where a cache line is 32 bytes and a Dword is four bytes. Other sized buffers or queues can be used.

Figure 4:
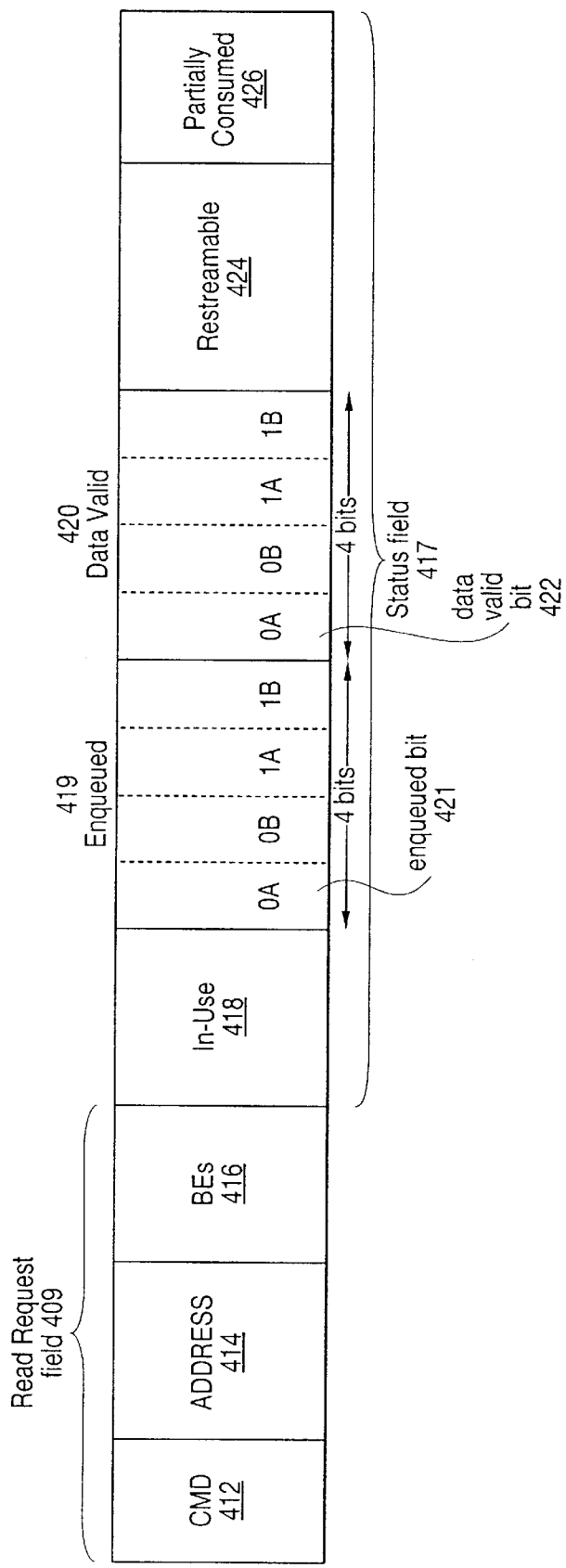
FIG. 4 illustrates the format of a tracker register according to an embodiment of the present invention.

FIG. 4 illustrates the format of a tracker register according to an embodiment of the present invention. Each tracker register 250–253 includes four fields, including a command field 412 for storing a PCI command (e.g., memory read multiple command), an address field 414 for storing the address of the PCI transaction, a byte enables (BEs) field 416 for storing the byte enables of the received PCI command (indicating which bytes are being read requested of less than 1 Dword) and a status field 417. The command, address and byte enables fields (412, 414 and 416) referred to collectively herein as a read request field 409. The read request field 409 is filled when an inbound read request from a PCI master is accepted. The BEs 416s are primarily used to identify the PCI master because most if not all reads will be more than 1 Dword.

The status field 417 can include up to five (or more) status fields.

An in-use bit 418 indicates whether this tracker register is currently being used to track an inbound read transaction from a PCI master. The in-use bit 418 is clear (e.g., a "0") when the tracker register is not being used (i.e., when the tracker register is available), and is set (e.g., a "1") when the tracker is being used to track an inbound read request from a PCI master.

An enqueued field 419 includes four enqueued bits 421, one bit corresponding to each of four IRDQs (IRDQ0A 215A, IRDQ0B 215B, IRDQ1A 217A and IRDQ1B 217B). Each enqueued bit 421 indicates whether or not bridge 80A has enqueued a read request, and transmitted a corresponding read request packet to MIOC 100 in response to an inbound read request from a PCI master that is being tracked in the tracker register. According to an embodiment of the present invention, rather than outputting a single read request packet (e.g., requesting eight cache lines), bridge 80A enqueues a plurality (e.g., two) of smaller read requests and transmits a read request packet for each enqueued read request. Outputting multiple smaller read request packets (rather than one large read request packet) for each inbound read request from a PCI master reduces inbound read latency as seen from the PCI master. Due to limitations on queue size, there may be only a predetermined number (e.g., two or four) of read request packets that can be enqueued or outstanding at a time.

Thus, bridge 80A receives an inbound read request from a PCI master and stores information in a tracker register to track the request (if a tracker register is available for tracking). Next, the enqueued bits 419 of each tracker register are examined to determine if there is less than the predetermined number (e.g., two) of outstanding read request packets. If there is less than the predetermined number, then bridge 80A generates and outputs two read request packets (or whatever number is available before exceeding the limit on outstanding read request packets) in response to the single received PCI transaction being tracked. A different IRDQ is selected for receiving the requested data returned from the MIOC 100 for each transmitted read request packet.

Status field 417 (FIG. 4) also includes a data valid field 420. The data valid field 420 includes four data valid bits 422, one bit for each of the IRDQs (IRDQ0A 215A, IRDQ0B 215B, IRDQ1A 217A and IRDQ1B 217B). Each data valid bit 422 indicates whether the requested data has been returned to bridge 80A (from MIOC 100) and is valid (available for the PCI master to receive). The data valid bits 422 for a tracker register only have meaning if the in-use bit 418 for that tracker register is set to a "1." When the in-use bit 418 of a tracker register has been set and all the enqueued bits 421 are clear, this indicates that no read request packets have been transmitted to the MIOC 100. If the in-use bit 418 is set and at least one of the enqueued bits is set, this indicates a read request packet has been transmitted to the MIOC 100. If the corresponding data valid bit 422 is clear, this indicates that the data requested by the read request packet has either (i) not yet been received by the corresponding IRDQ or (ii) has been received in the corresponding IRDQ but the associated read completion (the header of the read completion packet loaded into the OTQ 220) has not yet propagated to the head of the OTQ 220 (thus, the data is not yet valid). When the requested data returns in a read completion packet (loaded into a specified IRDQ) and the read completion (header of the read completion packet) propagates to the head of the OTQ 220, the data valid bit 422 for the IRDQ is set, and the data is provided to the master when the PCI master retries its PCI read request.

A restreamable bit 424 indicates whether fetched data stored in an IRDQ can be restreamed to a PCI master. In other systems, after requested data returns from the MIOC and is stored in an IRDQ, if the master disconnects without receiving the data, it is possible that the data in the IRDQ may become stale (inconsistent with the data stored in memory subsystem 110 or a cache) before the PCI master returns for the data. As a result, in prior systems, fetched data that is left in a data buffer after a master disconnects must be invalidated (and must be refetched from memory when the master returns for the data). However, according to an embodiment of the present invention, bridge 80A monitors data transfers between the PCI bus and the MIOC 100 to detect an invalidating event. If an invalidating event is detected (meaning the data in the IRDQ or data buffer has become stale) or if the IRDQ must be reallocated for another transaction, the bridge 80A invalidates the data stored in the IRDQ (and makes the IRDQs available for other transactions). If the data is not invalidated, when the PCI master returns for the data, bridge 80A can stream the data again (or "restream" the data) from the data buffer (the IRDQ) to the PCI master without refetching the data across MIOC 100, thereby reducing latency.

After data is stored in the IRDQ, if no invalidating event has occurred, the restreamable bit is set (to "1") to indicate the data can be restreamed. The bridge 80A then monitors data transfers between the PCI bus and MIOC 100. If an invalidating event is detected or the IRDQ is required for (allocated to) another read transaction, then the restreamable bit is cleared (to "0") to indicate the data cannot be restreamed to the PCI master when it returns for the data. In such a case, the data must be refetched from memory (by transmitting read request packets and awaiting for the data to be returned). If the restreamable bit 424 is cleared (because the data is not restreamable), the data in the IRDQ is invalidated and the IRDQ is reclaimed (or made available) by clearing the data valid bit 422 for the corresponding IRDQ.

A partially consumed bit 426 in a tracker register indicates whether or not any of the IRDQs storing data for the PCI read transaction being tracked in the tracker have been streamed (e.g., partially consumed) to the PCI master before a disconnection. If data has been stored in a pair of IRDQs in response to an read request, but not yet streamed or provided to the PCI master (consumed by the PCI master), the partially consumed bit 426 is cleared. If a PCI master subsequently reads or consumes a portion of the data in one of the IRDQs and then disconnects, the partially consumed bit is set to "1" to indicate that the IRDQ has been streamed. In such case, when the next inbound read request from a different PCI master is received, if all tracker registers are in-use, the in-use bit 418 of the tracker register having an IRDQ that was partially consumed is cleared and is made available for tracking the new PCI inbound read transaction. Thus, the partially consumed bit of each tracker register also provides a basis for deciding which tracker register should be re-allocated or reclaimed (made available) to track a new inbound read transaction (if all tracker registers are in use). Because the PCI master disconnected after partially reading the data, an assumption can be made that the master has completed the transfer and will not likely return for the remaining data. On the other hand, PCI masters which have not read any of their requested data (partially consumed bits are clear) must return for their data, according to the PCI specification. Thus, the tracker registers for such masters should peferably not be reclaimed or re-allocated (made available to incoming read transactions).

When an inbound read request from a PCI master is received by bridge 80A, bridge 80A determines whether or not it can accept the PCI transaction. According to an embodiment of the present invention, two conditions are required before an inbound read request can be accepted. First, bridge 80A checks to determine if a tracker register is available (or unused) by examining the in-use bit 418 of each tracker register. If all tracker registers are in-use, then bridge 80A determines if there is a tracker register having a partially consumed bit 426 that is set to a "1" (indicating that the tracker register should be made available for tracking the new read request). Second, bridge 80A compares the received inbound read request (command, BEs and address) from the PCI master to the read request field 409 of each tracker register to determine if bridge 80A is already tracking this read request. If a tracker register is available (or is made available due to a tracker register having a partially consumed IRDQ) and bridge 80A is not already tracking this inbound read request from the PCI master, then the inbound read transaction is accepted for tracking.

If an inbound read transaction from a PCI master is accepted (for processing and tracking), bridge 80A stores the PCI command in the command field 412 (FIG. 4), the address in the address field 414 and the byte enables of the PCI transaction in the byte enables (BEs) field 416 of the tracker register. The in-use bit 418 is then set to "1" to indicate that this tracker register is being used to track in an inbound read transaction. At this point, the enqueued bits 421, the data valid bits 422, the restreamable bit and the partially consumed bit are all clear ("0").

According to an embodiment of the present invention, bridge 80A generates two read request packets (each requesting four cache lines of data) for transmission over expander bus 70A for each PCI read transaction received and tracked in a Tracker register. This reduces inbound read latency as seen by the PCI master, as compared to generating and transmitting a single eight cache line read to memory. To generate the read request packet, controller 259 generates a read request by mapping the PCI command to an expander bus command, by using the same address and byte enables (BEs) received in the PCI transaction, and by assigning a transaction ID (TID) for the four cache line read request to memory. The TID allows the bridge 80A to track or match the requested data when it returns from the MIOC 100. The read request (command, address, BEs and assigned TID) is enqueued by storing the read request in the ITQ 220. After the read request is enqueued, the enqueued bit 421 is set for each read request.

Figure 5:
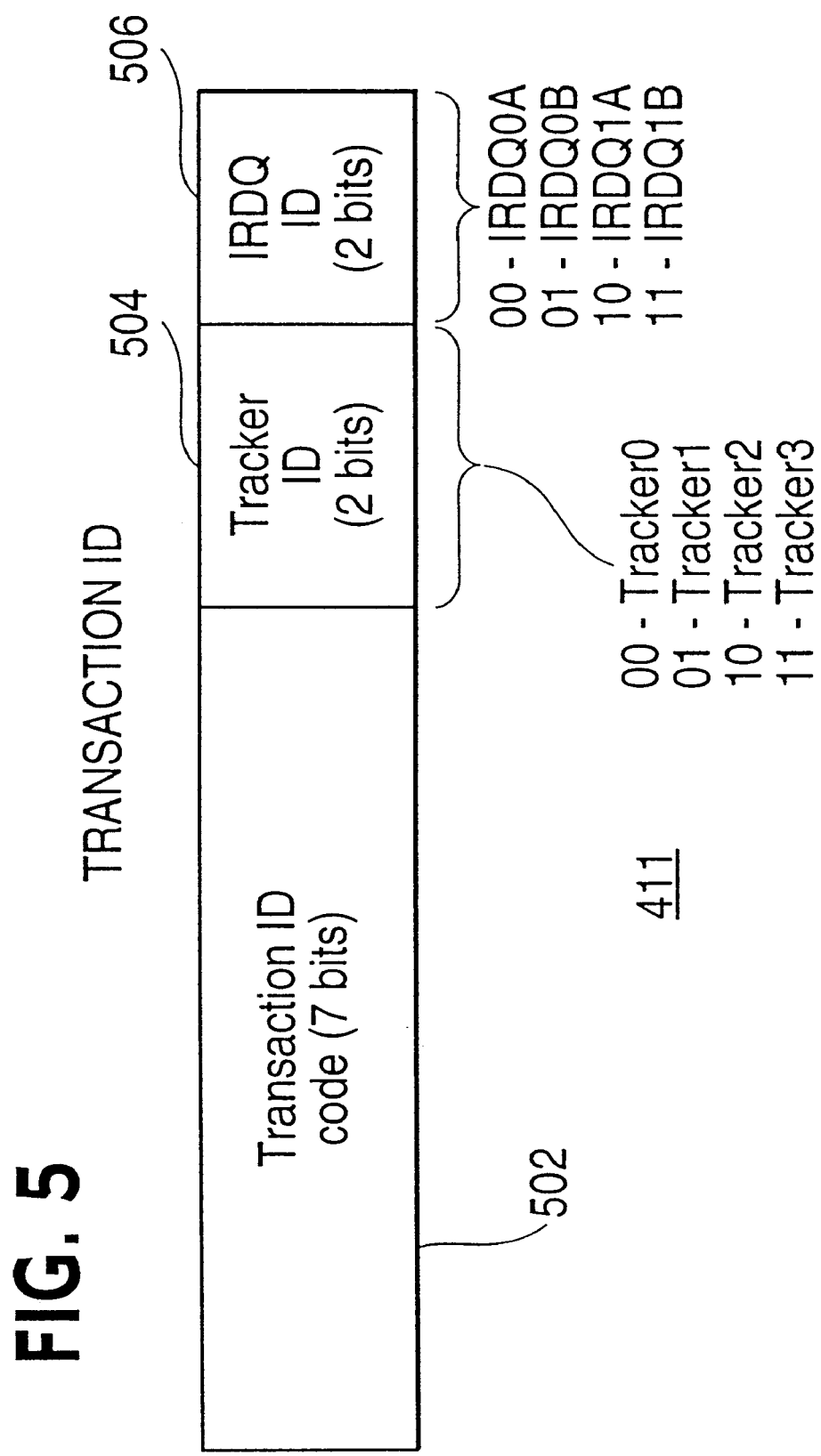
FIG. 5 illustrates the format of a Transaction ID according to an embodiment of the present invention.

FIG. 5 illustrates the format of a TID according to an embodiment of the present invention. TID 411 includes a transaction ID code which identifies the read transaction to memory. TID 411 also includes a tracker ID 504 and a IRDQ ID 506. Tracker ID 504 identifies the tracker register (tracker0, tracker1, tracker2 or tracker 3) which is tracking this transaction. The tracker ID 504 can be a two-bit code as shown in FIG. 5.

The IRDQ ID 506 identifies the IRDQ (IRDQ0A 215A, IRDQ0B 215B, IRDQ1A 217A or IRDQ1B 217B) that will be used to store the requested data when it returns from the MIOC 100. The IRDQ ID 506 can be a two-bit code as shown in FIG. 5.

A single PCI transaction is mapped to two read request packets. A different TID is used for each read request packet because data from each four cache line read will be stored in a different one of the four IRDQs (each IRDQ can store four cache lines). Moreover, the TID must specify which tracker register is tracking the memory read transaction (the request packet) because the four IRDQs can be used by different tracker registers.

Figure 6:
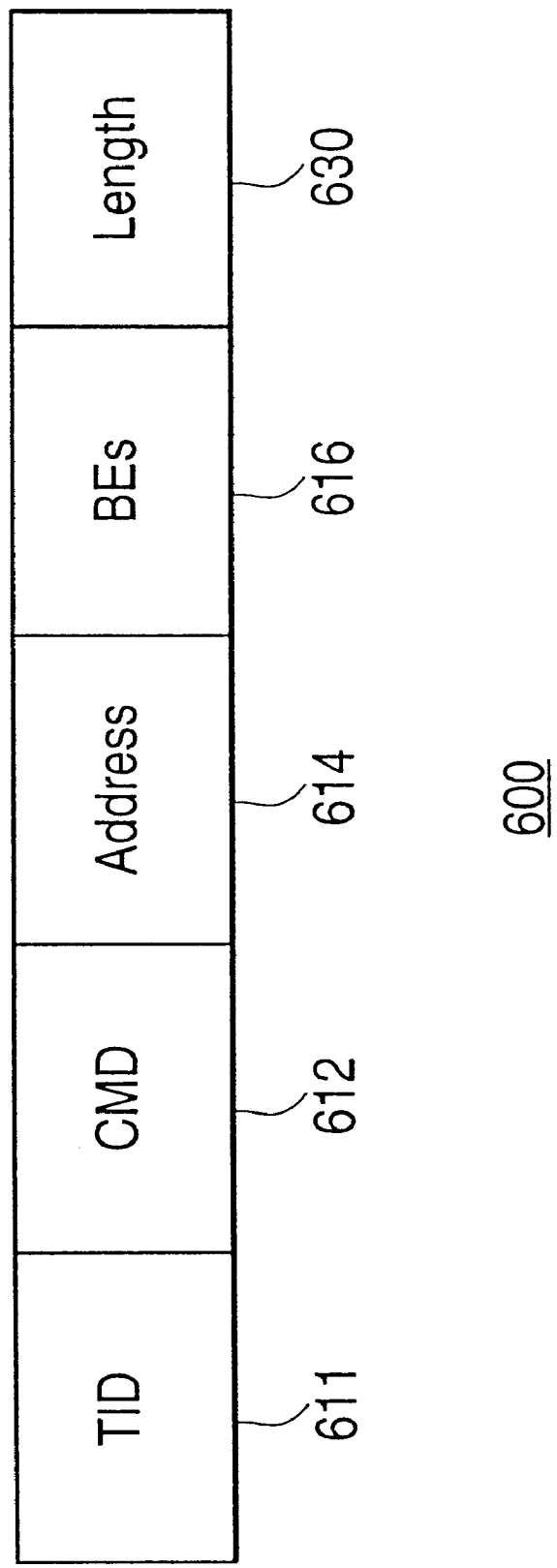
FIG. 6 illustrates a format of a read request packet according to an embodiment of the present invention.

When the inbound read request works its way to the front of ITQ 220, expander bus interface 235 creates and outputs a (expander bus) read request packet to MIOC 100 via expander bus 70A. FIG. 6 illustrates a format of a (expander bus) read request packet 600 according to an embodiment of the present invention. The read request packet 600 includes a TID field 611, a command field 612, an address field 614, a byte enables (BEs) field 616 and a length field 630. (A data field can also be included, but only for a write request packet for a write transaction). The TID, command, address and BEs stored in the ITQ 220 are used to generate corresponding fields in the read request packet 600. A length field 430 indicates the length of the read or write request, and according to an embodiment of the present invention will indicate four cache lines (128 bytes or 32 Dwords). The read request packet 600 may include additional fields.

According to an embodiment of the present invention, the PCI memory read transaction (for example, a memory read multiple command) is received which specifies only one address. In response to the PCI transaction, the bridge 80A generates two read request packets. Each read request packet speculatively requests four cache lines or 32 Dwords (128 bytes) of data from memory (even though the transaction specified only one address and it is not known how many cache lines the PCI master would actually like to receive). These cache lines are speculatively fetched from memory because many PCI read transactions to memory are performed for large contiguous blocks of data. Speculatively fetching multiple cache lines of data (as compared to fetching only one cache line) can improve the usage of the PCI bus bandwidth.

The MIOC 100 receives the read request packet, including the memory read command, address and length. The MIOC 100 then obtains the requested data from memory subsystem 110. According to an embodiment of the present invention, because each processor in FIG. 1 includes a cache, the MIOC 100 places a zero-length read transaction on the host bus 60 during a snoop phase of the transaction to snoop the host bus processor (or agent) caches. Each processor in FIG. 1 latches the read transaction and submits the address to their caches for lookup. If the lookup during this snoop phase results in a hit on a modified cache line in a processor's cache, the processor supplies the modified cache line to the host bus during a data phase of the transaction, which is latched by MIOC 100. Otherwise, if there is no cache hit, the MIOC 100 performs the read transaction via memory bus 50 to obtain the requested data directly from memory subsystem 110.

Figure 7:
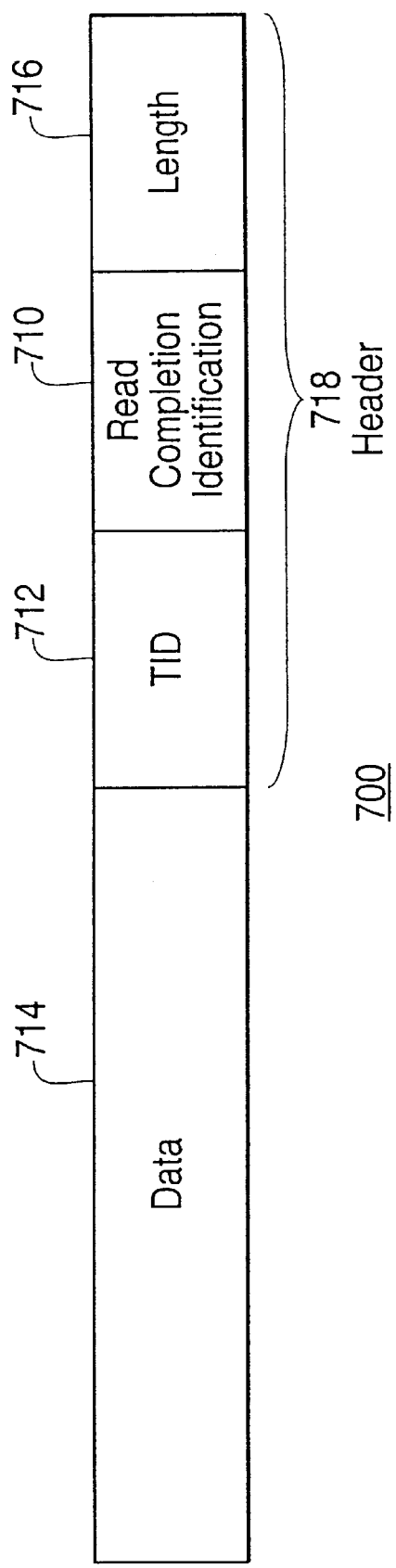
FIG. 7 illustrates a format of a read completion packet according to an embodiment of the present invention.

After MIOC 100 receives all four requested cache lines (128 bytes) from memory (e.g., from either a cache or memory subsystem 110), the MIOC 100 generates and outputs a read completion packet. FIG. 7 illustrates a format of a read completion packet 700 according to an embodiment of the present invention. The read completion packet 700 includes a header 718, including a length field 716 identifying the number of Dwords (or the number of bytes or cache lines) returned, a read completion identifier 710 which identifies the packet as a read completion packet and a TID 712 which is the same as the TID 611 in the read request packet 600. The read completion packet 700 also includes a data field 714 that contains the data fetched from memory (e.g., the four cache lines or 128 bytes of data).

Bridge 80A receives the read completion packet and examines the IRDQ ID 506 of the TID 712 to identify where the data (in data field 714) should be stored. The data in field 714 is then stored in the IRDQ identified by the IRDQ ID 506. Bridge 80A also stores the read completion header 718 in OTQ 205. When the read completion header 718 reaches the front of OTQ 205, bridge 80A examines the tracker ID 504 of the TID (in the read completion header 718) to identify the tracker register that is tracking this transaction. Bridge 80A then sets the data valid bit 422 (FIG. 4) corresponding to the identified IRDQ in the tracker register identified by tracker ID 504. The data valid bit 422 is not set until the read completion header 718 reaches the front of OTQ 205 to maintain proper transaction ordering. The read completion header is then popped off or pushed out of the OTQ205 (e.g., deleted).

When the PCI master repeats or retries the PCI read transaction, the bridge 80A compares the command, address and BEs of the retried PCI transaction to the information stored in the two four tracker registers. If the PCI command, address and BEs of the received PCI transaction matches the same fields in one of the tracker registers, then this transaction is already being tracked in the tracker register (and need not be loaded again into another tracker register). Bridge 80A then examines each of the data valid bits 422 in that Tracker register (FIG. 4) that is tracking this PCI read transaction. If all of the data valid bits 422 in the matching Tracker register are clear, then the bridge 80A issues a retry to the master (to cause the master to retry its request later) because the requested data is not yet validated (available).

At the time bridge 80A examines data valid bit 320, it is possible that the requested data may have actually been received from MIOC 100 and stored in the corresponding IRDQ, but the read completion header 718 has not yet reached the front of the OTQ 205 to allow the corresponding data valid bit 422 to be set. The bridge 80A cannot output the requested data until the data is valid (when the data valid bit 422 is set) to maintain proper transaction ordering.

If one of the data valid bits 422 is set in the identified tracker register (indicating that the requested data is present in the corresponding IRDQ), then the bridge 80A outputs (or streams) the data from the IRDQ onto the PCI data bus 90A, clears the data valid bit, and asserts the TRDY signal to indicate that the PCI master can latch the data. The data is output in 32-bit chunks onto the PCI bus 90A, with bridge 80A asserting TRDY signal each time, until the data (e.g., all 256 bytes) in the IRDQ0 215 have been consumed by the PCI master (e.g., provided to the PCI master). After all the data in IRDQ0 215 has been streamed or provided to the PCI master, the bridge 80A disconnects the PCI master in the case of multiple masters. Otherwise, speculative prefetching will be performed if servicing a single master as described below.

If the PCI master repeated the inbound read request and the data was not valid (indicated when the data valid bit 320 is still clear), then the bridge 80A issues a retry by asserting the STOP signal (instead of TRDY) on bus 90A, instructing the PCI master to retry its request later.

Prefetch Data When Servicing A Single Master

According to an embodiment of the present invention, additional cache lines of data are prefetched when the master returns for the original data if the bridge 80A is servicing only the single master. As an example, a master issues a PCI transaction to bridge 80A. (Transactions for other masters are not currently being tracked). Bridge 80A issues two read request packets, with each read request packet speculatively requesting four cache lines of data from memory. These two read requests are tracked in tracker0 register 250 (FIG. 2), with IRDQ0A 215A and IRDQ0B 215B being assigned to these two read request packets. The in-use bit 418 is set to indicate that tracker0 register 250 is being used, and the enqueued bits 421 for IRDQ0A and IRDQ0B are set to indicate that read requests were enqueued and corresponding read request packets were transmitted. After the requested data returns from MIOC 100 for these two read requests (four cache lines of data is received in each of two read completion packets), the data (e.g., four cache lines) for the first read request packet is placed in IRDQ0A 215A and the data (e.g., four cache lines) for the second read request is placed in IRDQ0B 215B. After the read completion headers for each read request propagates to the front of the OTQ 205, the data valid bits 422 for the IRDQ0A and ORDQ0B in tracker0 register 250 are set to indicate that this data is valid (is now available), and clears the enqueued bits 421 for IRDQ0A and IRDQ0B (to indicate that no read request packets are outstanding and thus, two more read request packets can be sent).

When the PCI master retries its PCI inbound read request to bridge 80A, bridge 80A matches the command, address and BEs to the read request field 409 in tracker0 register 251 (the match indicates that tracker0 register 250 is tracking this PCI read request). Bridge 80A examines the data valid bits 422 in tracker0 register 250 to determine if the data requested by the master is available (valid). Because the data valid bits 422 for IRDQ0A and IRDQ0B are set, bridge 80A first streams (outputs) the data from IRDQ0A to the PCI master in chunks of 32 bits (the width of the PCI data bus) until all data in IRDQ0A has been consumed by the master, and then clears the data valid bit 422 for IRDQ0A. Because the data valid bit 422 for IRDQ0B is set, the bridge 80A continues (without disconnecting the master) by streaming (transferring) the data from IRDQ0B 215B to the master, and clears the data valid bit 422 for IRDQ0B. According to an embodiment of the present invention, the use of two (or multiple) smaller read request packets (e.g., four cache lines) rather than a single larger (e.g., eight cache line) read request packet allows the bridge 80A to begin streaming the data sooner, thereby reducing the inbound read latency as seen by the PCI master. (This is because the MIOC 100 will not return the requested data to bridge 80A until all the requested data—four or eight cache lines—has been fetched from memory, and it will require a greater amount of time to fetch eight cache lines from memory than four). After receiving and validating the data in IRDQ0A, the bridge 80A can begin streaming the data from IRDQ0A to the PCI master, while in parallel (or concurrently), receiving and storing (and validating) the data from the second four line read request packet (stored in IRDQ0B). While bridge 80A is streaming the data from IRDQ0A to the PCI master, bridge 80A detects that the data valid bit for IRDQ0B is now set, and thus, the bridge 80A continues streaming the data from IRDQ0B after draining or unloading IRDQ0A.

To improve usage of the PCI bandwidth, it is desirable to continue to stream data continuously to the master. According to an embodiment of the present invention, the ITQ 220 and the OTQ 205 can store headers for only a predetermined number of transactions or read request packets (e.g., for two or four read request packets). Due to such limited queue resources, bridge 80A adaptively allocates all of the queue resources to the single master when servicing a single PCI master. Bridge 80A continues to allocate resources to only the first (single) master so long as no other masters submit inbound PCI read transactions to the bridge 80A.

When servicing only a single master data streaming performance (e.g., data throughput to the master) is improved by speculatively prefetching additional data, for example, after the return data is stored IRDQ0A and/or IRDQ0B and validated (data valid bits are set to "1"), if the first master retries the PCI read transaction before another master submits a new PCI read transaction, bridge 80A speculatively issues two additional read request packets to obtain the next eight cache lines of data for the first master. This is referred to as "prefetching" additional data because this additional data is fetched before the first master requests it. As an example, bridge 80A issues two additional read request packets (either before or in parallel with the streaming of data from IRDQ0A and IRDQ0B to the first master). These new request packets are tracked in same tracker0 register 250, but different IRDQs (i.e., IRDQ1A and IRDQ1B) are assigned for these two new read request packets because IRDQ0A and IRDQ0B are currently being unloaded or drained to the first PCI master. Because the same master (the first master) has returned for the data and no other masters are being serviced, bridge 80A speculatively continues to allocate queue resources to the first master because it is likely that the first master will request additional data before another master submits a read request.

This process of prefetching additional data when the first master retries the PCI read request is repeated so long as no other masters submit PCI read requests. For example, after the data in the second pair of packets is stored in IRDQ1A and IRDQ1B and is validated, if the first master issues a request for data, bridge 80A then speculatively issues two more read request packets (using IRDQ0A and IRDQ0B) while streaming data from IRDQ1A and IRDQ1B to the first master. This technique of read prefetching improves the data throughput to a PCI master because delays or dead time on the PCI bus are decreased due to the unloading of one pair of IRDQs (or data buffers) to the master while concurrently (or in parallel) loading additional data into another pair of IRDQs (or data buffers).

As described above, two additional read request packets are speculatively transmitted (speculative prefetch of data) when the first PCI master returns to request the data. Before the first master can retry the PCI read transaction it must first arbitrate for and obtain ownership of the PCI bus 90A (FIGS. 1 and 2). Arbiter 240 (FIG. 1) thus knows which master will have ownership of PCI bus 90A before the master drives a PCI transaction onto the PCI bus. According to another embodiment of the present invention, read prefetching can be further improved by prefetching the next eight cache lines (using two read request packets) after arbiter 240 grants ownership of the PCI bus to the first master for the next bus cycle. Thus, by using PCI bus arbitration decisions from arbiter 240, bridge 80A can speculatively issue the next two read request packets for the first master before the first master retries the PCI read transaction, thereby speeding the speculative prefetch operation.

Operation with Multiple Masters

If a second master submits a PCI read transaction, bridge 80A does not speculatively prefetch additional data for the first master, but allocates queue resources to the second master. In such case, the bridge accepts the PCI read transaction from the second master, and loads the command, address and BEs into the read request field 409 of a different tracker register (e.g., tracker1 register 251). If there is less than the maximum number of outstanding (in-flight) read request packets, then bridge 80A generates and transmits up to two read request packets corresponding to the PCI read transaction from the second master. Two of the available IRDQs (e.g., IRDQs not currently allocated to other transactions) can be allocated for storing data for these second master read transactions.

Because the bridge 80A (FIG. 2) includes four tracker registers (tracker0, tracker1, tracker2 and tracker3), bridge 80A can accept and track PCI read requests from up to four different PCI masters connected to a PCI bus. As discussed above, prefetching is not performed when bridge 80A is servicing (e.g., tracking and processing read requests for) more than one master.

As an example of operation with multiple masters, the command, address and BEs of the PCI read transaction from each of four different masters are accepted and loaded into the read request field of the corresponding tracker registers (tracker0 register 250, tracker1 register 251, tracker2 register 252 and tracker3 register 253, respectively). If a read request from a fifth PCI master is thereafter received, bridge 80A does not accept this PCI transaction for tracking because all four tracker registers are in-use, and bridge 80A issues a retry to the fifth PCI master. In this example ITQ 220 OTQ 205 can store information for four request packets, and there are four IRDQs for storing data. Thus, bridge 80A generates and transmits two read request packets for the first PCI master and two read request packets for the second PCI master (for a total of four request packets). The read request packets for the first master are tracked in tracker0 and use IRDQ0A and IRDQ0B. The read request packets for the second master are tracked in tracker1 and use IRDQ1A and IRDQ1B. A different TID is used for each of the four read request packets. The third and fourth PCI masters are tracked in tracker2 and tracker3 registers, respectively. However, no transactions are enqueued or read request packets transmitted at this time for the third and fourth masters because only four read requests can be enqueued at a time.

When the data for one of the read request packets returns and is stored in the corresponding IRDQ and is marked as valid, the data is provided to the master when the master retries the PCI read request. For example, if the data for the first read request packet of the first master returns and is stored in IRDQ0A and is validated. When the first master retries the PCI read transaction, bridge 80A streams (provides) the data from IRDQ0A to the first master. Bridge 80A also would continue streaming data from IRDQ0B if the data in IRDQ0B is marked as valid before the data in IRDQ0A is finished streaming to the first master. Otherwise, bridge 80A disconnects the first PCI master to handle the next PCI transaction. After streaming data from both IRDQ0A and IRDQ0B, bridge 80A disconnects the first master.

After bridge 80A streams the data to the first master from IRDQ0A and IRDQ0B, IRDQ0A and IRDQ0B become available and bridge 80A then enqueues and transmits two read request packets for the third master, which are being tracked in tracker2 register 252. These two read request packets for the third master will use the IRDQ0A and IRDQ0B to store the returned data (because IRDQ1A and IRDQ1B are being used for the second master). Similarly, after the data from IRDQ1A and IRDQ1B are streamed from bridge 80A to the second master, these queues are subsequently allocated for read request packets for the fourth master.

Partially Consumed Data Buffers (IRDQs)

If a PCI master only partially consumes data in an IRDQ and then the PCI master disconnects from the bridge 80A, all (i.e., both) IRDQs allocated to the disconnecting master are immediately made available for read request packets for other masters that are being tracked. If the IRDQs (of the disconnecting PCI master) are not needed for storing data for another master, the IRDQs will remain allocated to the disconnecting PCI master to allow the disconnecting master to return for the data (restreaming, discussed below).

Restreaming

After a PCI master submits an inbound read request, the eight cache lines of data are fetched from memory (using two read request packets) and stored in bridge 80A in two IRDQs (or data buffers). Each IRDQ stores four of the eight cache lines. The PCI master will return for the data by retrying the PCI read transaction. If the data is valid, the data will be provided or streamed to the master. A problem can arise, however, if the PCI master disconnects from bridge 80A after consuming (receiving) less than all of the eight cache lines. The PCI master will typically return again to continue receiving the requested data where it left off. However, it is possible that an invalidating event may have occurred which would cause the data stored in the IRDQs for the master to become stale (e.g., when the data in the IRDQs becomes inconsistent with the copy of the same data stored in memory subsystem 110 or a cache). As a result, when the PCI master returns to continue receiving the eight cache lines of data where it left off, many systems would invalidate the stored data (because it could be stale), and would refetch the data from memory, resulting in a significant inbound read latency.

In the present invention, breaking an eight line read into two separate four line reads increases the likelihood that the master will disconnect before consuming all eight cache lines (since data for the four line reads will arrive separately, and the second group of four lines may not be available until after the master disconnects from bridge 80A).

According to an embodiment of the present invention, if less than all of the IRDQ data (e.g., data stored in IRDQ0A and IRDQ0B) for an inbound PCI read transaction are streamed (provided) to the master before the master is disconnected, the partially consumed bit 426 in the tracker register is set. The restreamable bit 424 is also set to indicate that the data corresponding to the tracker register can be restreamed to the master (without refetching the data from memory). When the master returns for the rest of the data, the data can be restreamed (provided from the IRDQs) so long as the data in the IRDQs is not stale and the IRDQs were not reallocated to another master. Therefore, after a tracker register is marked as partially consumed (e.g., by setting the partially consumed bit 426 to 1), the bridge 80A begins monitoring data transfers between the PCI bus and the MIOC 100 to detect an invalidating event (an event that may render the data stored in the IRDQs stale). If an invalidating event is detected or if the IRDQ must be reallocated for another transaction, the bridge 80A invalidates the data stored in the IRDQ (clears the data valid bits 422), clears the restreamable bit and then makes the tracker register and IRDQs available for other transactions.

If the data is not invalidated and the IRDQs are not reallocated, when the PCI master returns for the data, bridge 80A can restream the data directly from the data buffer (the IRDQ) to the PCI master without refetching the data across MIOC 100, thereby reducing inbound read latency.

Bridge 80A can monitor or detect a variety of events that may indicate the data in the IRDQ is stale and should be invalidated. One or more of the following events will invalidate a partially read data buffer (IRDQ):

a) an outbound write will invalidate all partially read IRDQs.

b) The read completion for a new inbound read transaction will invalidate all partially read IRDQs, when the data from the read completion is transferred to the requesting master.

c) An IRDQ is invalidated if $2^{15}$ clocks have occurred since the data was fetched an no PCI master has returned to read it (consistent with PCI Local Bus Spec. Rev. 2.1).

d) The least recently partially read IRDQ will be invalidated and allocated to the next new inbound read if all IRDQs are in-use.

e) An outbound write will prevent an unread IRDQ from restreaming.

f) an inbound write will invalidate an IRDQ which contains the same address (or within a range) of the inbound write transaction.

Other conditions can also be observed that may indicate that the data in an IRDQ is stale or should be invalidated, as described in detail in commonly assigned copending application Ser. No. 09/012,775.

Figure 8:
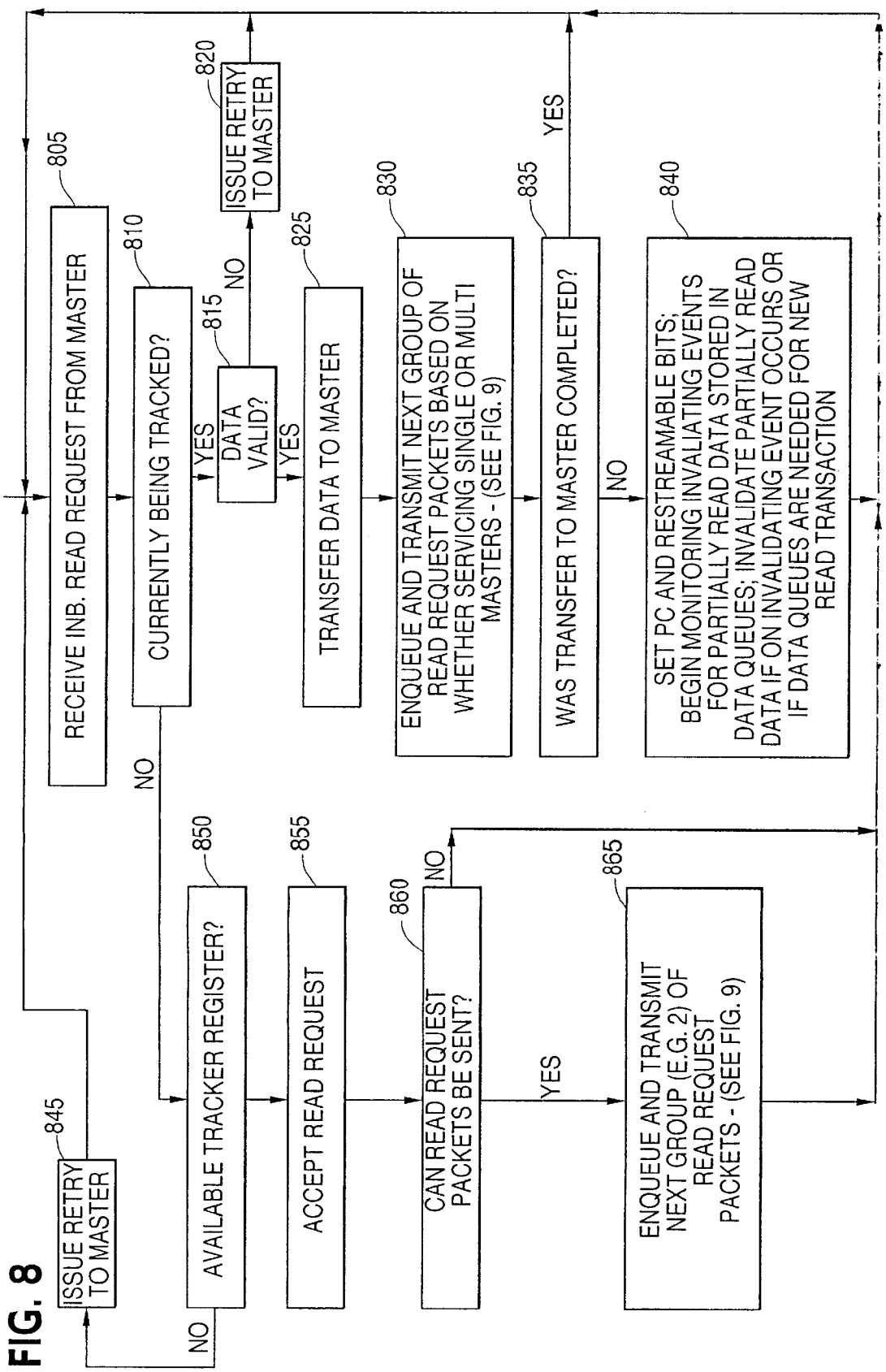
FIG. 8 is a flow chart illustrating operation of a system according to an embodiment of the present invention.

FIG. 8 is a flow chart illustrating operation of a system according to an embodiment of the present invention. At step 805, the bridge 80A receives an inbound read request from a PCI master. At step 810, bridge 80A determines if the received request is currently being tracked by comparing the received request to the read request field 409 in each tracker register.

If the read transaction is currently being tracked in one of the tracker registers, at step 815, bridge 80A determines whether the data requested by the master is valid (by examining the data valid bits 422 in the appropriate tracker register).

At step 820, if the data is not valid, bridge 80A issues a retry to the PCI master, and then proceeds back to step 805.

At step 825, if the data is valid, the data is transferred to the master.

At step 830, (if queue resources are available) the next group (e.g., two) of read requests are enqueued and corresponding group of read request packets are transmitted. These packets either request data for a new master (if bridge 80A is servicing multiple masters) or will prefetch data for the same master (if bridge 80A is servicing a single master). See FIG. 9 for details.

At step 835, bridge 80A determines whether or not the data transfer to the master was completed. If the transfer was completed, flow proceeds back to step 805.

If the master disconnected (or was disconnected) before all data in the data queues was transferred, flow proceeds to step 840. At step 840, the partially consumed bit 426 and the restreamable bit 424 are set in the tracking register, and the bridge begins monitoring to detect invalidating events to determine whether the data in the queues may be stale (and thus, should be invalidated) or the data queues are required for another read request. If an invalidating event occurs or the data queues are needed for another transaction, then the partially read data is invalidated and the queues are reallocated, and the data will be refetched from memory if the master reconnects to continue receiving the data. If the data is not invalidated and the queues are not reallocated, then the partially read data can be restreamed directly from the data queues in the bridge 80A. Flow then proceeds back to step 805.

If at step 810, it was determined that the received inbound read request is not currently being tracked, flow proceeds to step 850. At step 850, bridge 80A determines if their is an available tracker register (for tracking this request) by examining the in-use bits 418 of each tracker register.

If no tracker register is available, at step 845, bridge 845 issues a retry to the master and flow proceeds back to step 805.

If a tracker register is available, the inbound read request from the PCI master is accepted, step 855.

Figure 9:
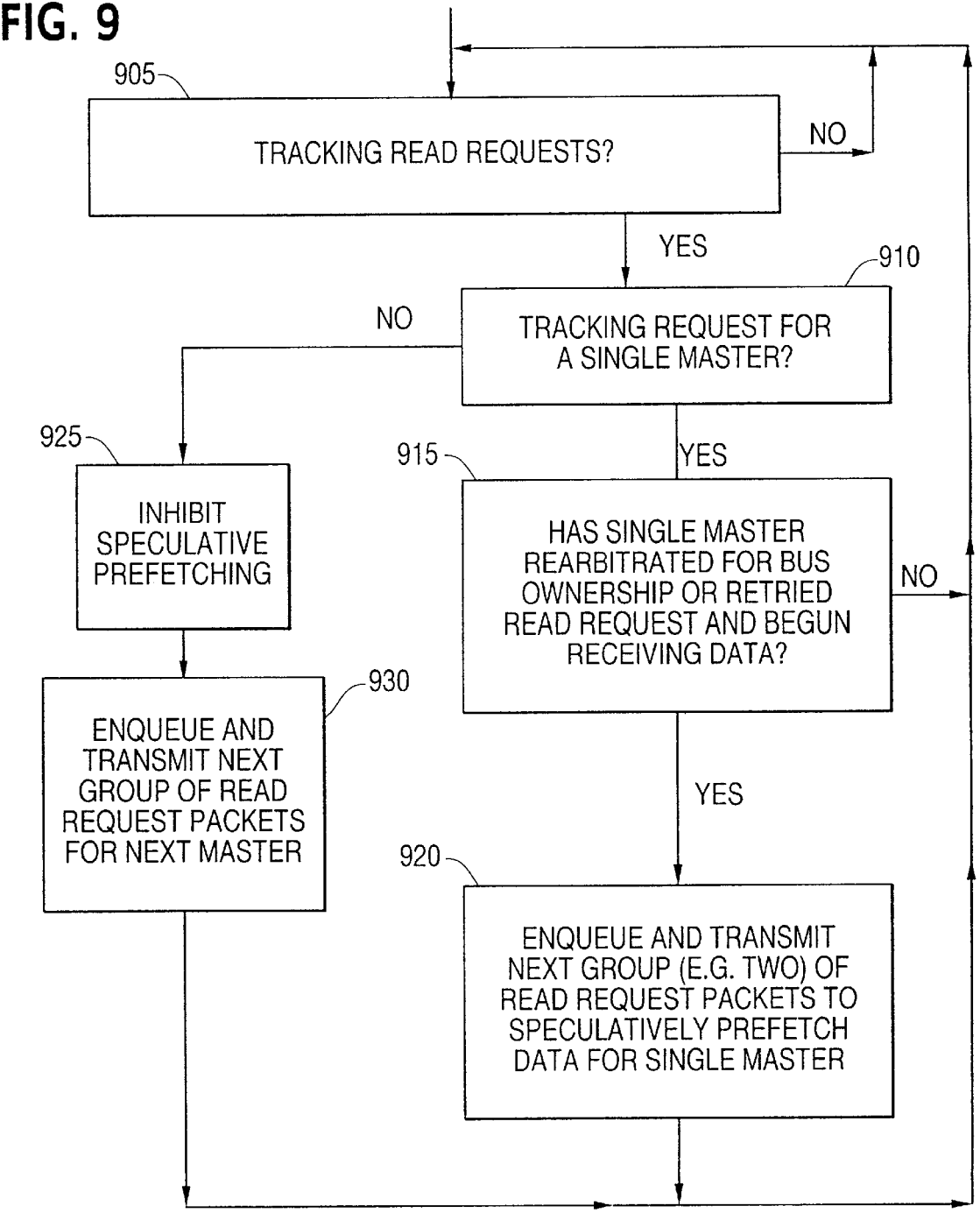
FIG. 9 is a flow chart illustrating activation or inhibition of speculative prefetch according to an embodiment of the present invention.

If queue resources are available (e.g., there is less than the maximum number of outstanding read request packets), then bridge 80A can enqueue and transmit read request packets for the next master (or for the same master as prefetching), depending on whether a single master or multiple masters are being serviced (See FIG. 9). After read request packets are transmitted (or if packets cannot be sent), flow proceeds back to step 805.

FIG. 9 is a flow chart illustrating activation or inhibition of speculative prefetch according to an embodiment of the present invention.

At step 905, bridge 80A determines whether there are inbound read requests that are being tracked (being processed). Bridge 80A continues to wait for read requests to be processed.

If there is one or more inbound read requests that are being tracked, at step 910, bridge 80A determines whether or not read requests are being tracked for more than one master. (According to an embodiment of the present invention, read requests for each master are tracked in a different tracker register. Thus, if there is more than one tracker register in-use, then there is more than one master being serviced).

If more than one master is being serviced, flow proceeds to step 925. At step 925, speculative prefetch is inhibited in favor of servicing multiple masters. At step 930, if queue resources are available, read request packets are transmitted for the next master. Thus, if more than one master is being serviced, queue resources are shared among multiple masters.

If only one master is being serviced, at step 915 bridge 80A awaits for the single master to rearbitrate for ownership of the PCI bus (or alternatively, to retry the inbound read request over the PCI bus to receive the data). When either of these events occurs, this indicates that bridge 80A is still serving only a single master, and the available queue resources are then allocated to the single master by issuing two additional read request packets (to speculatively prefetch data for the master). These new read request packets are generated and transmitted while the master receives the requested data from the data queues.

According to an embodiment of the present invention, the bridge 80A can be configured to operate in 32-bit mode or 64-bit mode. In 64-bit mode, PCI buses 90A and 90B connected to bridge 80A are combined to form a single 64-bit wide PCI bus, and data queues or buffers from both sides A and B can be used for 64-bit mode. In 32-bit mode, each PCI bus 90A and 90B operates as a separate 32-bit PCI bus, one PCI bus connected to each of the A and B sides of the bridge 80A. According to an embodiment of the present invention, in 32-bit mode, bridge 80A can issue either two 2-line read request packets or issue one 4-line read request packet. In 64-bit mode, bridge 80A can similarly issue either a single large (e.g., 4-line) read request packet, or multiple (e.g., two) smaller (e.g., 2-line) read request packets. However, the cache line sizes may be larger for 64-bit mode than in 32-bit mode. Moreover, as described above, there are advantages in issuing back-to-back multiple smaller read request packets, rather than a single read request packet in response to an inbound read request from a PCI master. One such advantage of issuing multiple (smaller) read request packets to the host bus in response to a PCI transaction is a decrease in the inbound read latency as seen by the PCI master because the master can begin receiving data after only two cache lines have been received, rather than waiting for all four cache lines to be received. Other advantages are described above.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of processing a read request comprising the steps of:

receiving an inbound read request from a first master;

transmitting a first read request packet and a second read request packet in response to the read request;

receiving data in response to the first and second read request packets;

storing the data received in response to the first read request packet in a first queue;

storing the data received in response to the second read request packet in a second queue;

receiving a retry of the read request from the first master after said step of storing data in the first queue;

detecting any events which may invalidate data in the first and second queues;

transferring data from the first and second queues to the master in response to the retry of the read request if no invalidating events are detected.

2. The method of claim 1 wherein said step of transferring comprises the steps of:

transferring data to the master from the first queue;

after completion of the step of transferring from the first queue, continuing to transfer data to the master from the second queue.

3. The method of claim 2 and further comprising the steps of:

in response to the step of receiving the retry from the master, transmitting a third and a fourth read request packets.

4. The method of claim 2 wherein said step of receiving a retry comprises the steps of:

the first master arbitrating for ownership of a bus;

receiving a retry of the read request via the bus.

5. The method of claim 4 and further comprising the steps of:

in response to the step of the first master arbitrating, transmitting a third and a fourth read request packets, said third and fourth read request packets speculatively requesting additional data for the master.

6. A method of processing a read request comprising the steps of:

receiving an inbound read request from a first master;

transmitting a first read request packet and a second read request packet in response to the read request;

receiving data in response to the first read request packet;

storing the data received in response to the first read request packet in a first queue and marking a retry of the read request from the first master;

determining whether the data in the first queue is available;

detecting any events which may invalidate a data in the first queue;

transferring data from the first queue to the master in response to the retry of the read request if the data in the first queue is available and no invalidating events were detected;

otherwise, issuing a retry to the master if the data in the first queue is not available.

7. The method of claim 6 and further comprising the steps of:

receiving data in response to the second read request packet;

storing the data received in response to the second read request packet in a second queue and marking the data in the second queue as available;

determining whether the data in the second queue is available before completion of said step of transferring data from the first queue;

after completing the step of transferring data to the master from the first queue, continuing to transfer data to the master from the second queue if the data in the second queue is available before completion of said step of transferring data from the first queue.

8. The method of claim 7 wherein said step of receiving data in response to the second read request packet comprises the step of receiving data in response to the second read request packet concurrently with said step of transferring from the first queue.

9. A method of processing a read request comprising the steps of:

receiving an inbound read request from a first master;

fetching first and second groups of data in response to the inbound read request;

storing the first group of data and marking the first group of data as available;

storing the second group of data and marking the second group of data as available;

receiving a retry of the read request from the first master;

detecting any event which may invalidate the first group of data and the second group of data;

if the first group of data is available and if no invalidating events were detected, transferring the first group of data to the first master in response to the retry of the read request from the first master; and after transferring the first group of data to the first master, if the second group of data is available, then transferring the second group of data to the first master.

10. The method of claim 9 wherein said step of receiving a retry comprises the steps of:

the first master arbitrating for ownership of a bus; and receiving a retry of the read transaction from the first master via the bus.

11. The method of claim 9 and further comprising the step of speculatively fetching a third and a fourth groups of data in response to the step of receiving the retry from the first master if requests from other masters are not being processed.

12. The method of claim 10 and further comprising the step of speculatively fetching a third and a fourth groups of data in response to the first master arbitrating for bus ownership and when requests from other masters are not being processed.

13. The method of claim 10 and further comprising the steps of:

detecting the step of the first master arbitrating for bus ownership;

detecting that read requests are being processed only by the first master; and speculatively fetching a third and a fourth groups of data in response to both of said steps of detecting.

14. The method of claim 9 and further comprising the step of speculatively prefetching a third and a fourth group of data for the first master if a retry of the read request from the first master is received after the first group of data is fetched and before a read request is received from a second master.

15. The method of claim 14 wherein said step of speculatively prefetching a third and fourth groups of data is performed only if transactions from the first master are being processed.

16. The method of claim 9 wherein said step of fetching first and second groups of data comprises the steps of:

transmitting a first request packet and receiving a first completion packet in response thereto, the first completion packet including the first group of data; and transmitting a second request packet and receiving a second completion packet in response thereto, the second completion packet including the second group of data.

17. A method of processing a read request comprising the steps of:

receiving an inbound read request from a first master;

fetching a first group of data for the first master in response to the inbound read request;

detecting any events which may invalidate the first group of data;

storing the first group of data and marking the first group of data as available and no invalidating events were detected;

receiving a retry of the read request from the first master;

speculatively prefetching a second group of data for the first master if a retry of the read request from the first master is received after the first group of data is fetched and before a read request is received from a second master.

18. The method of claim 17 and further comprising the steps of fetching a group of data for a second master and inhibiting speculative prefetching if a read request from the second master is received before the retry of the read request from the first master is received.

19. A method of processing a read request comprising the steps of:

receiving an inbound read request from a first master;

fetching first and second groups of data in response to the inbound read request;

storing the first group of data in a first queue;

storing the second group of data in second queue;

receiving a first retry of the read request from the first master;

transferring at least a portion of the data stored in the first and second queues in response to the retry of the read request from the first master;

the first master disconnecting or being disconnected before completing the transfer of data from the first and second queues;

detecting any events which may invalidate any untransferred data remaining in the first and second queues;

receiving a second retry of the read request from the first master; and if no invalidating events were detected, then transferring any of the untransferred data remaining in the first and second queues to the first master.

20. The method of claim 19 and further comprising the step of:

detecting if either of the first and second queues are needed to process a read request from a second master;

wherein said step of transferring any of the untransferred data remaining in the first and second queues comprises the steps of:

if no invalidating events were detected and if the first and second queues are not needed to process other read requests, then transferring any of the untransferred data remaining in the first and second queues to the first master;

otherwise, refetching the requested data for the first master.

21. An apparatus for processing a read request comprising:

a bus bridge coupled to a first bus and to a second bus, one or more masters coupled to the second bus, the bus bridge including:

a plurality of data registers; and a plurality of tracker registers for tracking read requests from one or more of the masters;

a memory system coupled to the first bus;

a processor coupled to the first bus;

a detector for detecting events which may invalidate data;

the bus bridge issuing multiple read request packets to the first bus in response to a single inbound read request received via the second bus from a master.

22. The apparatus of claim 21 wherein the first bus comprises an expander bus and the second bus comprises a PCI bus.

23. The apparatus of claim 21 and further comprising a controller coupled between the first bus and the process and the memory system.

24. A bus bridge comprising:

a plurality of data registers for storing data;

a plurality of transaction registers; a control circuit coupled to the data registers and transaction registers for controlling operation of the bus bridge;

a detector for detecting events which may invalidate data;

a plurality of tracker registers coupled to the control circuit, each tracker register being provided for tracking an inbound read request from an I/O master, the bus bridge generating and outputting two or more read request packets in response to each read request received from a PCI master that is being tracked.

25. The bus bridge of claim 24 wherein each tracker register includes a read request field for storing information identifying a read request, a partially consumed field indicating whether data stored in a data register has been partially consumed, and a restreamable bit indicating whether data stored in a data register that was previously streamed can be restreamed to a master when the master returns for the data.

26. An apparatus for processing a read request comprising:

means for receiving an inbound read request from a first master;

means for transmitting a first read request packet and a second read request packet in response to the read request;

means for receiving data in response to the first and second read request packets;

means for storing the data received in response to the first read request packet in a first queue;

means for storing the data received in response to the second read request packet in a second queue;

means for receiving a retry of the read request from the first master after storing the data in the first queue;

means for detecting any events which may invalidate the data from the first and second queues;

means for transferring data from the first and second queues to the master in response to the retry of the read request.

* * * * *